United States Patent
Goldstein

(10) Patent No.: US 6,676,150 B1
(45) Date of Patent: Jan. 13, 2004

(54) BICYCLE BALANCE TRAINING APPARATUS

(76) Inventor: Linda K. Goldstein, 13784 Graber Ave., Sylmar, CA (US) 91342-2618

( * ) Notice: Subject to any disclaimer, the term of this patent is extended or adjusted under 35 U.S.C. 154(b) by 0 days.

(21) Appl. No.: 10/256,421

(22) Filed: Sep. 27, 2002

(51) Int. Cl.[7] .................................................. B62H 1/00
(52) U.S. Cl. ....................................... 280/293; 280/217
(58) Field of Search .............................. 280/217, 288.4, 280/293, 295, 296, 298, 212

(56) References Cited

U.S. PATENT DOCUMENTS

| | | | | |
|---|---|---|---|---|
| 3,787,066 | A | * 1/1974 | Hautier | 280/217 |
| 4,712,806 | A | * 12/1987 | Patrin | 280/217 |
| 4,768,607 | A | * 9/1988 | Molina | 180/165 |

* cited by examiner

Primary Examiner—Lesley D. Morris
Assistant Examiner—L. Lum

(74) Attorney, Agent, or Firm—Joseph R. Birkner

(57) ABSTRACT

A bicycle balance training apparatus for attachment to a bicycle is disclosed. The bicycle balance training apparatus is used for training a rider to ride a bicycle such as a two wheeler. The apparatus has a support structure, a post disposed on the support structure and a bracket cooperating with the post and with a bicycle frame to which the support structure is removably attached, a strut disposed on the support structure and removably and adjustably attachable to a flywheel axle and to a bicycle axle for positioning and for supporting the support structure and a pair of flywheels rotatably attached to the support structure in a linearly spaced relationship with respect to each other. The pair of flywheels are electrically driven by the pair of drive wheels coupled to a motor with a belt and cooperating with a power source. The pair of drive wheels directly engage the pair of flywheels. When in use, the pair of flywheels are positioned to straddle a wheel of the bicycle disposed therebetween the flywheels without the pair of flywheels contacting the ground. The pair of flywheels create a gyroscopic effect to provide stabilization and balance control when the bicycle is ridden.

20 Claims, 3 Drawing Sheets

BICYCLE BALANCE TRAINING APPARATUS

FIELD OF THE INVENTION

This invention relates generally to a bicycle balance training apparatus. More particularly, the present invention relates to a bicycle balance training apparatus utilizing an electrically operated gyroscopic component used for learning to ride a two wheeler type of bicycle.

BACKGROUND OF THE INVENTION

Typically, learning to ride a two wheeler type of bicycle is often a daunting experience for children and for novice bike riders. Not accustomed to the balance required to successfully ride a bike often results in unwanted falls resulting in bodily injury. Although more often than not, such injuries, fortunately are minor, it would be advantageous if they could be minimized during the stages of learning to ride a bicycle. To assist and to train a beginner bike rider, usually, a human holds onto the bike or onto the rider, essentially physically guiding the rider as the bike is slowly ridden and gradually letting go to allow the rider to freely ride. A problem with such human intervention is that a beginner rider may require continued physical assistance for a long period of time before confidence and riding skills are fully developed. This results in over reliance upon physical help which may cause one to discontinue riding due to the fear of falling off the bike until help is available which may not always be the case especially when parents or friends are busy and engaged in other activities and can not assist a rider such as a child at a particular moment. Training wheels which are bolted onto the axle of the rear wheel of a bicycle and engage the ground are commercially available. The problem with the training wheel types of devices are that they serve only as a third or fourth wheel to prevent a bicycle from tipping over, and do not, in and of themselves, really teach a rider proper balance necessary for successfully riding a bicycle, rather they act as a false sense of security.

No device is known such as a bicycle balance training apparatus that properly and rapidly trains a rider to ride a two wheeler bicycle by experiencing the actual balance and feel of riding a bicycle and one which is easy to use.

In view of the above mentioned problems and limitations associated with learning to ride a bicycle and with existing training wheel devices and methods, it was recognized by the present youth inventor that there is an unfulfilled need for a bicycle balance training apparatus and one which is simple in design, practical, fun to use and is economically manufactured.

Accordingly, it becomes clear that there is a great need for a bicycle balance training apparatus which overcomes the disadvantages associated with learning to ride a bicycle. Such an apparatus should be one that simulates the actual balance effect in riding a bicycle, reduces the time to learn to ride a bicycle as well as one which eliminates the need for training wheels and for physical intervention and the problems associated therewith.

SUMMARY OF THE INVENTION

It is therefore an object of this invention to provide a bicycle balance training apparatus for learning to ride a bicycle which avoids the aforementioned problems.

It is an object of this invention to provide a bicycle balance training apparatus which utilizes an electrically powered flywheel that acts as a gyroscope to provide balance when learning to ride a bicycle such as a two wheeler.

It is another object of this invention to provide a bicycle balance training apparatus which operates without the need for ground contacting training wheels or for human assistance in bicycle riding.

It is another object of this invention to provide a bicycle balance training apparatus which is readily adapted to fit onto a wide variety of bicycles with little modification.

It is another object of this invention to provide a bicycle balance training apparatus which may be removably attached to and placed onto another bicycle when training is completed It is a further object of this invention to provide a bicycle balance training apparatus which may be manufactured from readily available materials by conventional manufacturing processes.

It is a still a further object of this invention to provide a bicycle balance training apparatus that is portable, light weight, simple in design, simple to manufacture, low in cost and fun to use.

This invention results from the realization that there is a great need for a bicycle balance training apparatus that can conveniently and properly train a rider to maintain balance when learning to ride a bike. The resulting invention provides a user the capability of conveniently being able to safely learn to ride a bicycle without the problems of having to depend on a human trainer and upon ground contacting training wheels.

The above and the other objects are achieved in accordance with the present invention, which, according to a first aspect, provides a bicycle balance training apparatus having a support structure with means for mounting the support structure to a bicycle. A pair of flywheels are rotatably attached to the support structure and disposed in a linearly spaced relationship with respect to each other and, when in use, positioned to straddle a wheel of the bicycle disposed therebetween without the pair of flywheels contacting the ground. The pair of flywheels being driven by a drive means cooperating with a power source for inducing a gyroscopic effect to provide stabilization and balance control when the bicycle is ridden.

The second aspect is a special case of the first aspect of this invention with additional features. According to a second aspect of the invention the drive means includes a pair of drive wheels coupled to a motor via a belt. The wheels directly engage the pair of flywheels. The means for mounting the support structure to the bicycle is a bracket means including a post and a clamp attachable to a frame of the bicycle with fasteners to which the support structure is removably attached and a strut attachable to each flywheel axle and to the bicycle axle. The power source is a D.C. battery and the motor is a D.C. motor.

The third aspect is a special case of the first aspect and second aspects of this invention with additional features. According to a third aspect of the invention a bicycle balance training apparatus for attachment to a bicycle is disclosed including a means for adjusting a vertical height of the support structure and for positioning the support structure on the bicycle without modifications to the bicycle. The height adjusting means is in the form of a slot therein the strut and a strut clip removably disposed on the strut near the slot and partially covering the slot when in use thereby adding structural support to the disposed area of said strut as well as serving as a bearing surface during assembly of the support structure to the bicycle. The D.C. motor may be a variable speed D.C. motor.

DETAILED DESCRIPTION OF PREFERRED EMBODIMENTS

Figure 1:
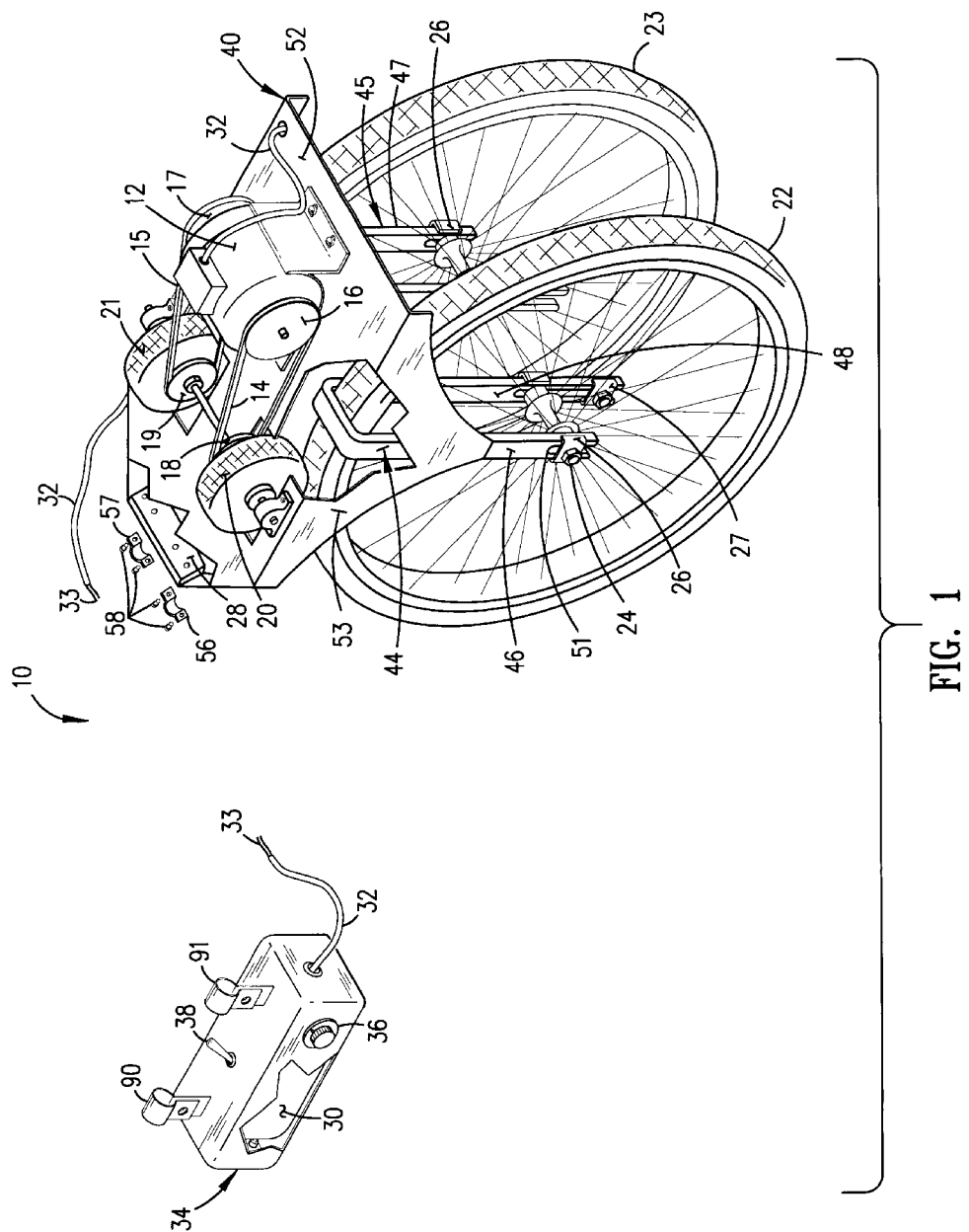
FIG. 1 is a perspective view of a preferred embodiment of a bicycle balance training apparatus of the instant invention.

Looking more particularly at the drawings, there is shown in FIG. 1 a preferred embodiment of a bicycle balance training apparatus which is generally indicated at 10, according to a preferred embodiment of the present invention.

FIG. 1 is a perspective view of a preferred embodiment of a bicycle balance training apparatus 10 of the instant invention. The major components include a support structure 40, a power source 30, a mounting means 42 and a bracket means 55 for mounting the support structure 40 to a bicycle 70 best seen in FIGS. 2 to 4.

The support structure 40 has a pair of flywheels 22, 23 rotatively mounted thereon, a pair of drive wheels 20, 21 mounted on and passing through slots 59, 60 in a plate 52 on the support structure 40. The pair of drive wheels 20, 21 being driven by a drive means including a motor 12 via a belt 14, 15 cooperating with a drive pulley 16, 17 on the motor 12 and a driven pulley 18, 19 on the drive wheel 20, 21. The pair of flywheels 22, 23 are rotatably attached to support structure 40 in a linearly spaced relationship with respect to each other for producing a gyroscopic effect for creating stabilization and balance control for a rider learning to ride a bicycle 70 such as a two wheeler.

The pair of drive wheels 20, 21 directly engage the pair of flywheels 22, 23 and are operated from the power source 30 which, preferably is a D.C. battery having sufficient capacity to power the motor 12, which preferably is a D.C. motor. Although not necessary for operation, for convenience of use, the D.C. battery, preferably, may be electrically rechargeable. The power source 30 may, for convenience, be housed in a control box 34 having a power switch 38. A motor speed control 36 may be provided when a variable speed D.C. motor option is chosen. A conduit 32 for wires 33 is electrically connected from the power source 30 via power switch 38 and motor speed control 36 to the motor 12.

Figure 2:
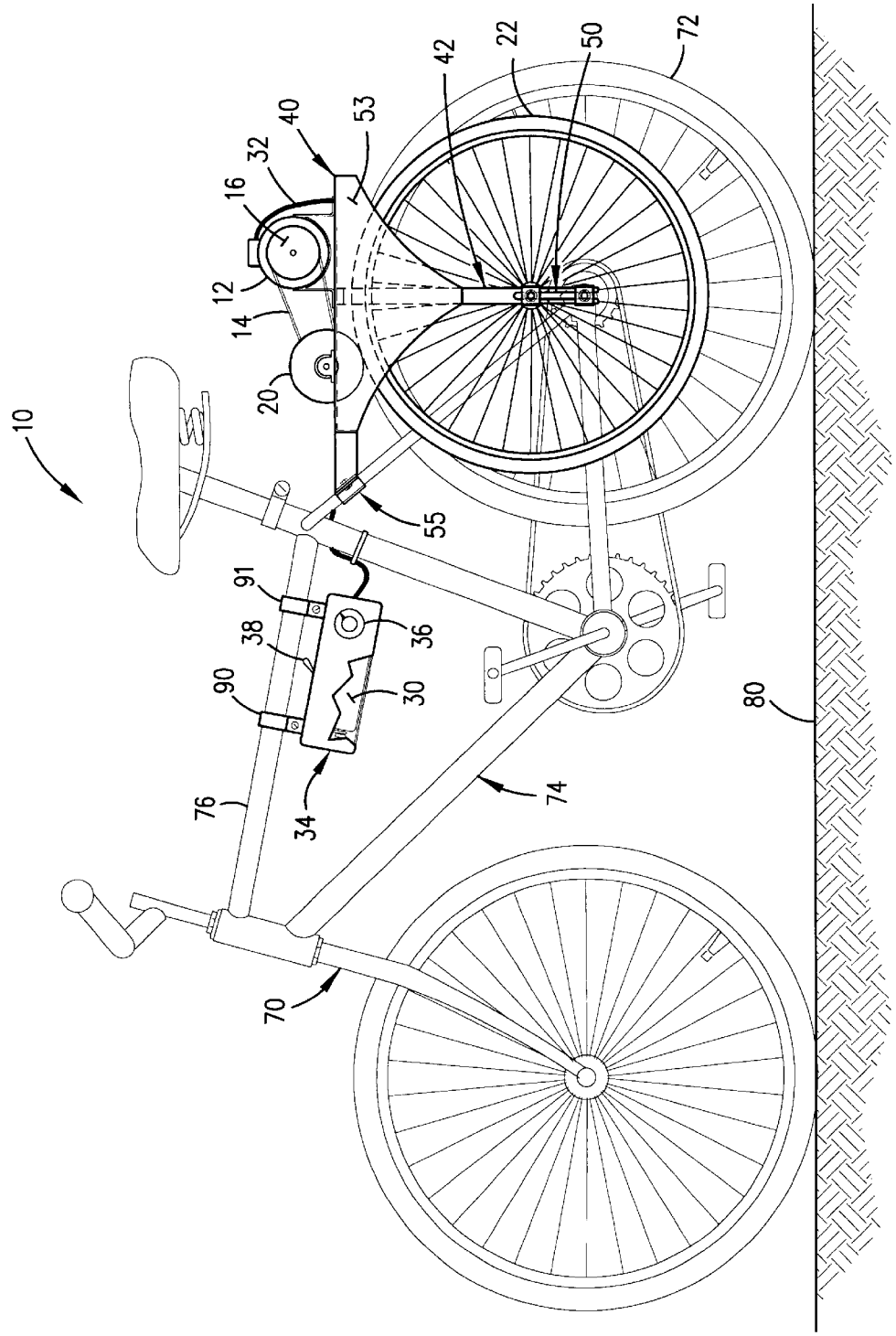
FIG. 2 is a right side elevation view of the bicycle balance training apparatus 10 of FIG. 1 shown in use installed on a two wheeler bicycle, shown in phantom.
Figure 3:
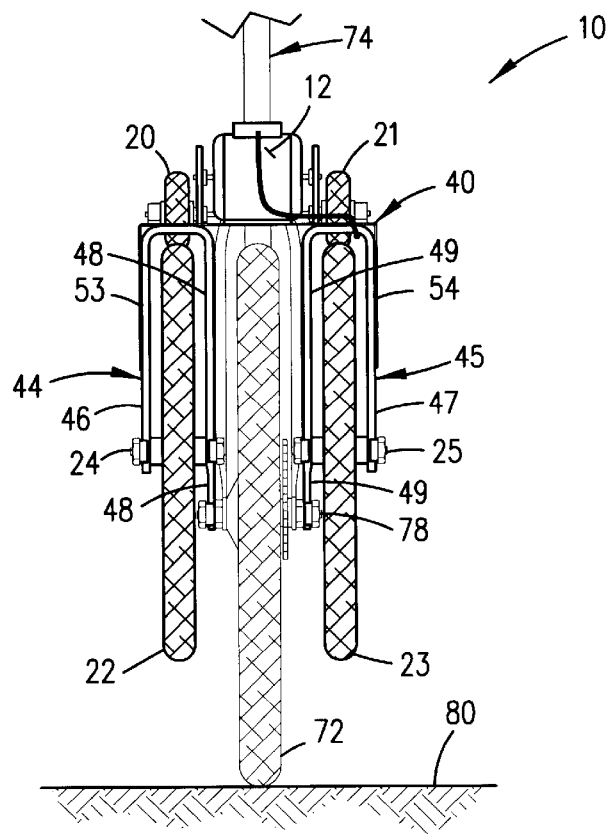
FIG. 3 is a rear elevation view of the bicycle balance training apparatus 10 of FIG. 2.

The mounting means 42 for mounting the support structure 40 to the bicycle 70 includes a post 28 disposed on the support structure 40 and the bracket means 55 cooperating with the post 28 and with a bicycle frame 74 to which the support structure 40 is removably attached with a fastener 58. The bracket means 55 preferably is a "U" shaped member such as a clamp 56, 57. The post 28 preferably may be threaded to receive the fastener 58 which pass through clamp 56, 57. The post 28 may be welded or fastened to the support structure 40. The support structure 40 being attached to the bicycle 70, so that the flywheels 22, 23 are not contacting the ground 80 when in use with a bicycle wheel 72 of the bicycle 70 disposed therebetween the pair of flywheels 22, 23 as best seen in FIGS. 2 and 3. It is understood that the bracket means 55, alone, with the post 28 being of sufficient thickness, could support the support structure 40 in a cantilever manner. However, to provide additional support, the mounting means 42, preferably, further includes a strut 44, 45 disposed on the support structure 40 and removably and adjustably attachable to a flywheel axle 24, 25 and to a bicycle axle 78 for positioning and for supporting the support structure 40. The strut 44, 45 being generally "U" shaped and has a short leg 46, 47 and a long leg 48, 49. The short leg 46, 47 can be readily attached to the flywheel axle 24, 25 and the long leg 48, 49 can be attachable to both the flywheel axle 24, 25 and to the bicycle axle 78. The strut 44, 45 may be welded or fastened to the plate 52 and to a gusset 53, 54 extending from the plate 52. Use of the gusset 53, 54 adds strength and rigidity to the support structure 40.

To make the bicycle balance training apparatus 10 more useful, the bicycle balance training apparatus 10 may be removably attachable to a wide variety of bicycles with little or no modification so that when training is no longer needed, the bicycle balance training apparatus 10 can be used on another bicycle, thereby saving cost and providing convenience and versatility of use. This may be accomplished with the strut 44, 45 having a vertical height adjusting means 50 for adjusting a vertical height of the support structure 40 so that the drive wheel 20, 21 may frictionally engage the flywheel 22, 23 and for positioning the support structure 40 on the bicycle 70 without modifications to the bicycle 70. The vertical height adjusting means 50 includes the strut 44, 45 having a slot 51 therein and a strut clip 26, 27 removably disposed on the strut 44, 45 near the slot 51 and partially covering the slot 51 when in use thereby adding structural support to the disposed area of the strut 44, 45 as well as serving as a bearing surface during assembly of the support structure 40 to the bicycle 70.

FIG. 2 is a right side elevation view of the bicycle balance training apparatus 10 of FIG. 1 shown in use installed on a two wheeler bicycle 60, shown in phantom. The control box 34 containing the power source 30, and at least the power switch 38, may, preferably, be mounted on the bicycle cross bar 76 of the bicycle frame 74 of the bicycle 70. This may be accomplished with battery clamp 90, 91 on the control box 34 fastened to the bicycle cross bar 76 with conventional fasteners. The conduit 32 may also be routed along the bicycle cross bar 76 along the bicycle frame 74 under the plate 52 and electrically connecting it to the motor 12. In the case where a bicycle cross bar 76 is not provided on the bicycle 70, the control box 34 and contents may be mounted at any convenient location on the bicycle frame 74 or on the plate 52.

FIG. 3 is a rear elevation view of the bicycle balance training apparatus 10 of FIG. 2. The pair of flywheels 22, 23 are clearly shown suspended above the ground 80 straddling the bicycle wheel 72 of the bicycle 70.

Figure 4:
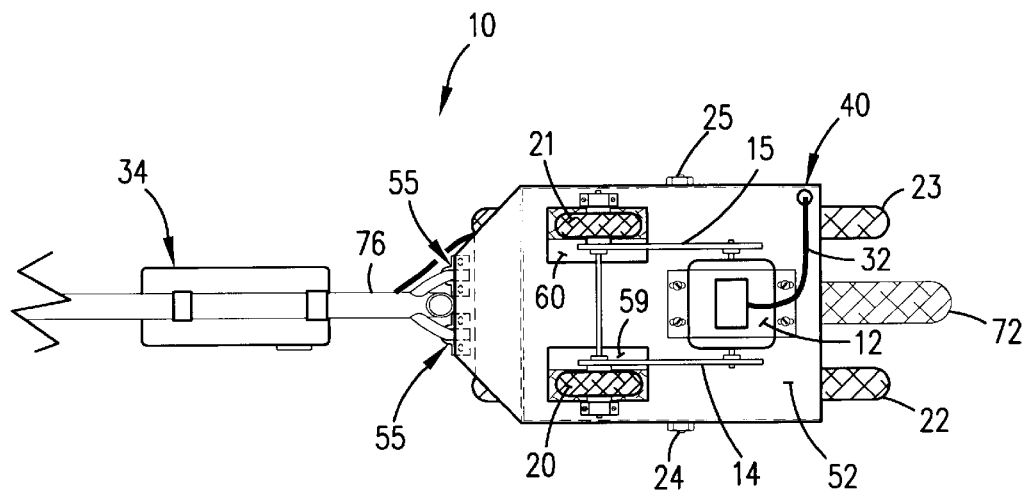
FIG. 4 is a top plan view of the bicycle balance training apparatus 10 of FIG. 2.

FIG. 4 is a top plan view of the bicycle balance training apparatus 10 of FIG. 2.

Operation is best understood by referring to FIGS. 1 to 4. Basically, when the bicycle 70 such as a two wheeler is ridden by a person learning to ride, the switch 38 is activated and power from the power source 30 which, preferably is a D.C. battery, turns the motor 12 which rotates the pair of drive wheels 20, 21 which in turn, spin the pair of flywheels 22, 23 at an r.p.m. determined by the speed characteristics of the motor and being of a sufficient amount to stabilize the bicycle 70 when ridden. If the speed of the motor 12 is desirable to be varied, the motor speed control 36 may be used to set a desired rotational speed to suit a particular rider's needs. With the flywheels 22, 23 rotating, when a rider diverts from a desired normal vertical riding position, the flywheels 22, 23 act as a gyroscope and tend to counteract the leaning motion off vertical. In compliance with the laws of physics as applied to gyroscopic motion and the principle of conservation of angular momentum, the righting forces caused by precession tend to restore the bicycle 70 to the desired vertical position thereby providing stabilization and balance control for a novice rider in learning to ride the bicycle 70. The restoration gyroscopic effect simulates a realistic feeling of riding a bicycle, naturally, unlike other bicycle riding training devices and methods.

The bicycle balance training apparatus 10 may be fabricated from readily available materials and by conventional fabrication and assembly techniques. Metal forming and machining operations may be employed for fabrication of the support structure 40 including the plate 52, gusset 53, 54, strut 44, 45, clamp 56, 57 and post 28 which may be made from one of aluminum and steel for strength, for durability, to reduce weight and for ease of fabrication. Standard fasteners such as nuts, bolts, screws, washers, rivets and welds, as appropriate for a particular application may be employed in the fabrication. Control box 34 may be made from plastic by plastic molding or formed from light gage aluminum or steel. It is understood that other materials may be used for construction such as, but not limited to plastic, fiberglass, wood and metal composite matrix materials without departing from this disclosure. Other conventional components such as D.C. batteries, D.C. motors, switches, motor speed controls, wire, conduits, and other parts are commercially available. The flywheel 22, 23 may be standard bicycle wheels and the drive wheel 24, 25 may be small wheels both of which are readily available.

Surprisingly, the instant invention provides an added advantage and recognizes a problem and adequately and completely addresses an unfulfilled need, in that a bicycle balance training apparatus 10, in the manner disclosed, in effect, provides a convenient apparatus which eliminates the need to use conventional bicycle training wheels and physical intervention for balance control and provides the desired above mentioned advantages and benefits to a user.

It is understood that the bicycle balance training apparatus 10 may be constructed in a wide variety of sizes shapes and style variations. For example, the bicycle balance training apparatus 10 may be made to be readily installable on numerous bicycle designs with little modification. One practical advantage of the invention is that it provides a convenient, practical, low cost, bicycle balance training apparatus 10 which allows a user to conveniently and properly learn to ride a bicycle with little effort. A further advantage of the invention is that the bicycle balance training apparatus 10 is designed for ease of manufacture by standard methods and by using readily available materials.

Of course, a wide variety of further uses and advantages of the present invention will become apparent to one skilled in the art.

As disclosed, it is apparent that the instant invention can provide other options. One skilled in the art will realize that the foregoing discussion outlines the more important features of the invention to enable a better understanding of the instant invention and to instill a better appreciation of the inventor's contribution to the art. It must be clear that the disclosed details of construction, descriptions of geometry and illustrations of inventive concepts are mere examples of possible manifestations of the invention.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A bicycle balance training apparatus comprising:
    a support structure;
    means for mounting said support structure to a bicycle;
    a pair of flywheels rotatably attached to said support structure and disposed in a linearly spaced relationship with respect to each other and, when in use, positioned to straddle a wheel of the bicycle disposed therebetween without said pair of flywheels contacting the ground; and
    said pair of flywheels driven by a drive means cooperating with a power source for inducing a gyroscopic effect to provide stabilization and balance control when the bicycle is ridden.

2. The bicycle balance training apparatus of claim 1 wherein said drive means includes a pair of drive wheels coupled to a motor via a belt and said drive wheels directly engaging said pair of flywheels.

3. The bicycle balance training apparatus of claim 2 wherein said means for mounting said support structure to the bicycle includes a post disposed on said support structure and a bracket means cooperating with said post and with a bicycle frame to which said support structure is removably attached.

4. The bicycle balance training apparatus of claim 3 wherein said mounting means further includes a strut disposed on said support structure and removably and adjustably attachable to a flywheel axle and to a bicycle axle for positioning and for supporting said support structure.

5. The bicycle balance training apparatus of claim 4 wherein said strut having a means for adjusting a vertical height of said support structure and for positioning said support structure on the bicycle without modifications to the bicycle.

6. The bicycle balance training apparatus of claim 5 wherein said vertical height adjusting means includes said strut having a slot therein and a strut clip removably disposed on said strut near the slot and partially covering the slot when in use thereby adding structural support to the disposed area of said strut as well as serving as a bearing surface during assembly of said support structure to the bicycle.

7. The bicycle balance training apparatus of claim 6 wherein said support structure further comprises a gusset for structural strength.

8. The bicycle balance training apparatus of claim 7 wherein said support structure is substantially made from one of aluminum and steel.

9. The bicycle balance training apparatus of claim 8 wherein said motor is a D.C. motor.

10. The bicycle balance training apparatus of claim 9 wherein said power source is a D.C. battery.

11. A bicycle balance training apparatus comprising:
    a support structure having a plate and a gusset extending from said plate;
    means for mounting said support structure to a bicycle;
    a pair of flywheels rotatably attached to said support structure and disposed in a linearly spaced relationship with respect to each other and, when in use, positioned to straddle a wheel of the bicycle disposed therebetween without said pair of flywheels contacting the ground;

said pair of flywheels driven by a pair of drive wheels partially extending through said plate having a slot therethrough and said pair of drive wheels coupled via a belt to a motor adjustably mounted on said plate;

said drive wheels directly engaging said pair of flywheels; and said pair of flywheels and said pair of drive wheels cooperating with a power source for inducing a gyroscopic effect to provide stabilization and balance control when the bicycle is ridden.

12. The bicycle balance training apparatus of claim 11 wherein said means for mounting said support structure to the bicycle includes a post disposed on said support structure and a bracket means cooperating with said post and with a bicycle frame to which said support structure is removably attached.

13. The bicycle balance training apparatus of claim 12 wherein said mounting means further includes a strut disposed on said support structure and removably and adjustably attachable to a flywheel axle and to a bicycle axle for positioning and for supporting said support structure.

14. The bicycle balance training apparatus of claim 13 wherein said strut having a means for adjusting a vertical height of said support structure and for positioning said support structure on the bicycle without modifications to the bicycle.

15. The bicycle balance training apparatus of claim 14 wherein said vertical height adjusting means includes said strut having a slot therein and a strut clip removably disposed on said strut near the slot and partially covering the slot when in use thereby adding structural support to the disposed area of said strut as well as serving as a bearing surface during assembly of said support structure to the bicycle.

16. The bicycle balance training apparatus of claim 15 wherein said support structure is substantially made from one of aluminum and steel.

17. The bicycle balance training apparatus of claim 16 wherein said motor is a D.C. motor.

18. The bicycle balance training apparatus of claim 17 wherein said power source is a D.C. battery.

19. The bicycle balance training apparatus of claim 18 wherein said D.C. motor is a variable speed D.C. motor.

20. A bicycle balance training apparatus for attachment to a bicycle, said apparatus comprising:

a support structure substantially made from one of aluminum and steel having a plate and a gusset extending from said plate for structural support;

means for mounting said support structure to a bicycle including a post disposed on said support structure and a bracket means cooperating with said post and with a bicycle frame to which said support structure is removably attached and further including a strut disposed on said support structure and removably and adjustably attachable to a flywheel axle and to a bicycle axle for positioning and for supporting said support structure;

means for adjusting a vertical height of said support structure and for positioning said support structure on the bicycle without modifications to the bicycle;

a pair of flywheels rotatably attached to said support structure in a linearly spaced relationship with respect to each other and supported by said support structure and electrically driven by a pair of drive wheels coupled to a motor with a belt and cooperating with a power source and said drive wheels directly engaging said pair of flywheels; and, when in use, said pair of flywheels positioned to straddle a bicycle wheel disposed therebetween said pair of flywheels without contacting the ground; and said pair of flywheels creating a gyroscopic effect to provide stabilization and balance control when the bicycle is ridden.

\* \* \* \* \*